United States Patent Office 2,978,409
Patented Apr. 4, 1961

2,978,409
COMPOSITION AND METHOD FOR THE ELIMINATION OF WATER-BLOCK IN OIL WELLS

Harold L. Greenwald and Ralph L. Givens, Jr., Levittown, Pa., assignors to Rohm & Haas Company, Philadelphia, Pa., a corporation of Delaware No Drawing. Filed July 9, 1957, Ser. No. 670,658

18 Claims. (Cl. 252—8.55)

This invention concerns a method for the elimination of water-block in oil wells. It more particularly deals with a method for effectively and economically revivifying oil wells made sluggish and moribund by water-block and returning them to a state of active profitable production. It further concerns a new composition of matter employed in the present method.

It is more or less understood that when a subterranean pool or volume of water accumulates in an oil-producing formation near a producing oil well the water can, and usually does, act as a block or barrier between the well and the remainder of the oil producing formation. The effect of such a block by the water is generally quite serious. There usually results an appreciable drop in the oil productivity of the well and quite often the stoppage is so great that wells are abandoned because they are believed to be exhausted. Generally, in instances of this type, the pressures available are not great enough to force the water into the well to thereby break up the water-block.

It is quite common for oil and water to coexist in subterranean cavities adjacent to an oil well. The presence of the water may be due to one or more of several factors. The water may come from drilling muds used in the completion of the oil well or from well treatment procedures based on aqueous systems or systems containing an appreciable amount of water. There may also be an intrusion of water from the water table into the oil-producing formation or there may be present some connate water from the original water system. A related and likewise disturbing situation is that of coning, wherein a well that is producing oil and water, in which the water comes from above the bottom of the oil formation, is blocked by water that runs down along the layer immediately surrounding the well. This descent of the water is favored by the differences in density between oil and water.

Once water in an oil-producing formation becomes strategically situated, the loss in oil productivity can become enormous and is always considerable. The degree of blocking varies, for the most part, with the amount and location of the blocking water. For instance, the closer the water is to the bore of the well the less it takes to produce the same effect as a greater amount at a greater distance. It has been determined that the most serious water-blocks occur within four to five feet of the bore of the well, although many extend to ten feet and occasionally as far as twenty-five feet and beyond.

It is the principal object of this invention to provide an effective and inexpensive method for disintegrating water-blocks in oil wells. Other objects of this invention will be apparent hereinafter.

The method according to the present invention consists of introducing into an oil well, hampered by water-block, a composition made up of about 0.1 to 8%, preferably about 0.5 to 3.0%, by weight of at least two and preferably three specific compounds, to be defined hereinafter, in an oleaginous carrier or vehicle. One of these compounds has the formula

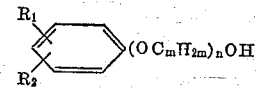

$R_1$ and $R_2$ may each represent a hydrogen atom or an alkyl group of up to twenty carbon atoms and the total number of carbon atoms in $R_1$ and $R_2$ should range between 12 and 25, $m$ is an integer of two to four, and $n$ is an integer of 4–19. The symbol $n$, when possible within its definition, preferably ranges from values of 6–11 less than the carbon atom total of $R_1$ and $R_2$ when $m$ is equal to two. For instance, when $R_1$ and $R_2$ are each nonyl, representing a total of eighteen carbon atoms, $n$ preferably may vary between seven and twelve. Each of the symbols $R_1$ and $R_2$ may also be defined as $C_{B-1}H_{2B-1}$, in which B ranges from 1 to 21. Thus, when B equals 1, hydrogen is defined, and, when B equals 2 to 21, alkyl groups are indicated.

The symbols $R_1$ and $R_2$ may each typically represent a hydrogen atom, a methyl, ethyl, propyl, butyl, pentyl, hexyl, octyl, nonyl, decyl, dodecyl, tetradecyl, hexadecyl, octadecyl, or eicosyl group, provided that jointly the groups $R_1$ and $R_2$ contain a total of twelve to twenty-five carbon atoms. Illustratively, when $R_1$ is hydrogen $R_2$ may range from dodecyl to eicosyl; when $R_1$ is butyl, $R_2$ may vary from octyl to eicosyl; and when $R_1$ is decyl, $R_2$ may range from ethyl to tridecyl. It is preferable to have the groups $R_1$ and $R_2$ alkyl and of similar molecular sizes and, most advantageous of all, to have them represent the same groups, such as octyl, nonyl, decyl, or dodecyl. The alkyl groups of $R_1$ and $R_2$ may exhibit any known spatial configuration. For instance, decyl may be n-decyl, isodecyl, 1-methylnonyl, 1,4-dimethyloctyl, 2-ethyloctyl, 1-methyl-2-ethylheptyl, 2,2,4,4-tetramethylhexyl, and the like. Also, the $R_1$ and $R_2$ groups may occupy any of the possible positions on the benzene ring. If either $R_1$ or $R_2$ is a hydrogen atom, the one representing an alkyl group is preferably located at the ortho or para position with respect to the ether group on the benzene ring. If both $R_1$ and $R_2$ are alkyl groups the ortho and para positions, with respect to the ether group, are the favored positions.

The ether chain, represented by $(OC_mH_{2m})_n$, may contain from four to nineteen units of alkylene oxide. There must always be present some ethylene oxide and, in addition, propylene oxide or butylene oxide or both may be employed. It is preferable to use ethylene oxide entirely or ethylene oxide predominantly, with small amounts of either or both of propylene or butylene oxides. For maximum benefits, when propylene or butylene oxides or both are used in addition to at least the minimum required amount of four units of ethylene oxide, it is advantageous to employ an additional unit of ethylene oxide for every two units of propylene oxide and three additional units of ethylene oxide for every two units of butylene oxide. Mixtures of compounds containing all three of the stated alkylene oxides or compounds in which all three of the alkylene oxides are present are quite satisfactory.

The alkylphenoxypolyalkyleneoxyalkanols having the formula

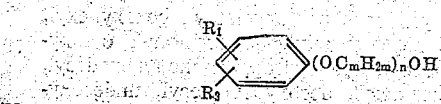

as already defined, are known compounds or ones that may be readily prepared by known methods. Typical compounds that may be used include

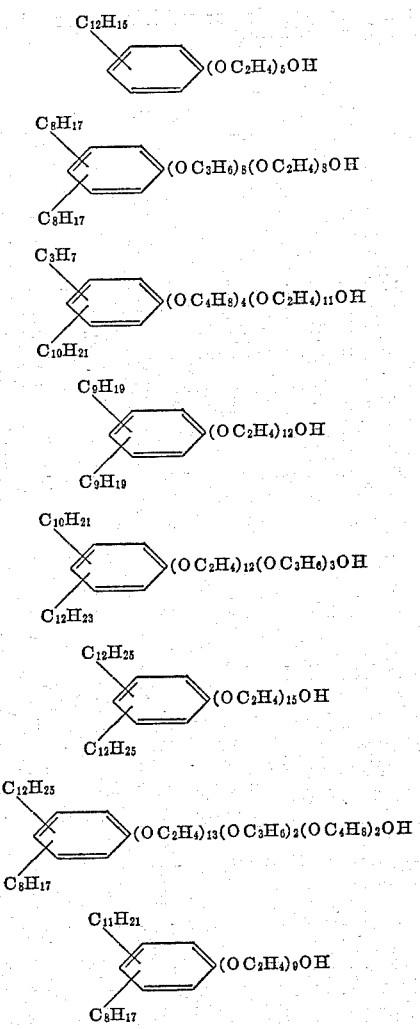

and

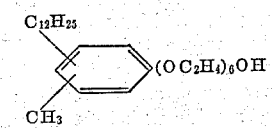

A single compound of the type from the above illustrative group may be used or mixtures of two or more of them may be employed with equally satisfactory results.

Also, to be employed with the $R_1R_2$ phenoxypolyalkyleneoxyalkanol is a compound having the formula $R_3OH$, in which $R_3$ is an alkylphenyl group of 14 to 18 carbon atoms, such as octylphenyl, dibutylphenyl, nonylphenyl, decylphenyl, dihexylphenyl, or dodecylphenyl; an alkyl group of twelve to twenty-five carbon atoms, such as dodecyl, tetradecyl, octadecyl, eicosyl, or pentacosyl; and alkoxyalkyl group of twelve to twenty-five carbon atoms, such as methoxyundecyl, methoxydodecyl, methoxyeicosyl, ethoxydecyl, ethoxyoctodecyl, propoxynonyl, propoxytetradecyl, butoxyoctyl, butoxyhexadecyl pentoxyheptyl, pentoxytridecyl, pentoxyeicosyl, hexoxyhexyl, hexoxyoctadecyl, heptoxypentyl, heptoxynonyl, octoxybutyl, octoxytetradecyl, nonoxypropyl, nonoxyhexadecyl, decoxyethyl, decoxydecyl, decoxypentadecyl, undecoxymethyl, undecoxytetradecyl, dodecoxydodecyl, tetradecoxyoctyl, hexadecoxybutyl, octadecoxypropyl, octadecoxyheptyl, eicosoxypentyl, or the like. The $R_3OH$ compound is employed in amounts of about 5 to 50%, preferably 5 to 25%, by weight of the compound

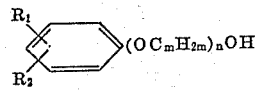

and the latter compound may be reduced in the present composition by the amount of the $R_3OH$ compound used, if desired. The $R_3OH$ compound is necessary in the present composition in order to produce a stable and homogeneous system. Otherwise, under some untoward conditions of use, such as low temperatures, the $R_1R_2$ phenoxypolyalkyleneoxyalkanol alone in a carrier becomes a heterogeneous system to the point where stratification occurs. Under such observed circumstances, the efficiency of the stratified system is so reduced that its use in commercial applications is substantially barred. As a surprising concurrent benefit the $R_3OH$ component also synergistically improves the effectiveness of the $R_1R_2$ phenoxypolyalkyleneoxyalkanol component so that an enhanced overall result is effected both in stability and effectiveness.

Typically, if a total of 1% by weight of water-block eliminating components in 99% by weight of an oleaginous carrier is contemplated, there may be used, for instance, 0.75% of

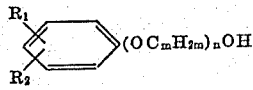

and 0.25% of $R_3OH$. Of course, lesser amounts of the latter compound may be employed with attendant greater amounts of the former compound, as long as the 1% total is maintained in the above illustration and the previously stated ratio of components is observed. Other amounts of the two above-described compounds may be employed within the ranges and definitions already given.

As an additional component to the present composition, there may be used a compound having the formula

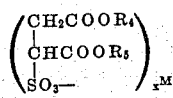

$R_4$ and $R_5$ are alkyl, alkenyl, or aralkyl groups, preferably alkyl, whose combined number of carbon atoms totals from ten to twenty, M is an alkali metal, preferably one whose atomic weight ranges from about seven to thirty-nine, an alkaline earth metal, preferably one whose atomic weight ranges from about 24 to 137, an ammonium group or a low molecular weight amino group, and $x$ is an integer of one to two varying with the valence of M. The carrier or vehicle is preferably crude oil previously removed from the well to be treated or any similar inexpensive oil, preferably from a nearby source, in order to simplify operations.

The symbols $R_4$ and $R_5$ may typically stand for methyl, ethyl, propyl, butyl, pentyl, hexyl, octyl, nonyl, decyl, dodecyl, tetradecyl, octadecyl, nonadecyl, vinyl, allyl, butenyl, pentenyl, hexenyl, octenyl, decenyl, dodecenyl, octadecenyl, benzyl, phenylethyl, phenylpropyl, phenyloctyl, naphthylmethyl, or naphthylethyl groups, provided that they jointly contain a total of ten to twenty carbon atoms. Illustratively, when $R_4$ is methyl, $R_5$ may range from nonyl to nonadecyl or the corresponding alkenyl groups or phenylpropyl and the like or naphthylethyl and the like; when $R_4$ is butyl, $R_5$ may vary from hexyl to hexadecyl or the corresponding alkenyl groups or aralkyl groups of seven to sixteen carbon atoms; and when $R_4$ is octyl, $R_5$ can be from ethyl to dodecyl or the corresponding alkenyl groups or aralkyl groups of seven to twelve carbon atoms. It is preferable to have the groups $R_4$ and $R_5$ alkyl and of similar molecular sizes and best of all, particularly from the convenience viewpoint, to have them represent the same groups, such as octyl, nonyl, or decyl. The alkyl and alkenyl groups of $R_4$ and $R_5$ may exhibit any known spatial configuration. For instance, octyl may be n-octyl, isooctyl, 1-methylheptyl, 1,4-dimethylhexyl, 2-ethylhexyl, 1-methyl-2-ethylpentyl, 2,2,4,4-tetramethylbutyl, and the like.

Typically, M may stand for sodium, potassium, lithium, magnesium, calcium, barium, strontium, ammonium, a methylamino, dimethylamino, trimethylamino, ethylamino, hydroxyethylamino, propylamino, diethylamino, N-methyl-N-ethylamino, butylamino, piperidino, morpholino, or pyrrolidinyl group, and the like.

Typical sulfosuccinate compounds that may be used include dioctyl sodium sulfosuccinate, didecyl potassium sulfosuccinate, ethyl dodecyl piperidinosulfosuccinate, dinonyl ammonium sulfosuccinate, hexyl octyl dimethylaminosulfosuccinate, butyl octyl calcium sulfosuccinate, pentyl decyl lithium sulfosuccinate, dihexyl barium sulfosuccinate, heptyl dodecyl morpholino sulfosuccinate, dioctenyl sodium sulfosuccinate, octenyl dodecyl potassium sulfosuccinate, dibenzyl morpholinosulfosuccinate, dinaphthylethyl sodium sulfosuccinate, benzyl dodecenyl potassium sulfosuccinate, naphthylethyl octyl sodium sulfosuccinate, and the like. The present sulfosuccinates are known compounds or ones that may be readily prepared by known methods.

These sulfosuccinates are frequently useful as water-block breaking compounds themselves, but, in conjunction with the components

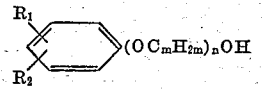

and $R_3OH$, a composition is produced whose water-block breaking effectiveness is increased far beyond that predictable from the components employed. Furthermore, this three component system has a more prolonged activity and can be more readily reused than the two component system. Also, in corresponding situations, smaller amounts of the three components are required than in the two component system which indicates the overall synergistic effect of the three component combination. The defined sulfosuccinates may be employed in amounts by weight ranging from one-tenth to ten times the amount of $R_1R_2$ phenoxypolyalkyleneoxyalkanol used. The total amount of active agents in the oleaginous carrier ranges by weight from about 0.1 to 8.0%, preferably 0.5 to 3.0%, whether two or three components are to be employed.

Particularly useful in the circumstances of the present invention are compositions containing

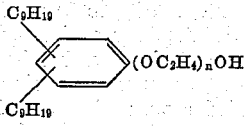

and

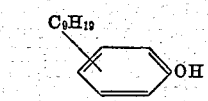

in which $n = 7$ to 12 particularly 8

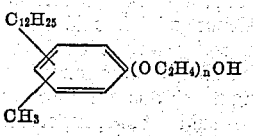

and

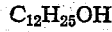

in which $n = 7$ to 12 particularly 8,

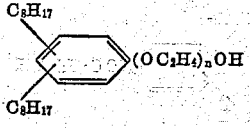

and

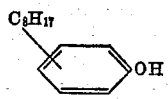

in which $n = 7$ to 12, particularly 8, and the above formulations containing dioctyl sodium sulfosuccinate, dinonyl ammonium sulfosuccinate, or didecyl methylaminosulfosuccinate. The relative amounts of the above components must, of course, conform to the prior definition.

Experience will indicate wells that contain water-block conditions. Those skilled in the art of oil production recognize certain conditions as cogent evidence of water-block in oil wells. These conditions include: markedly decreased production after the well has been worked over; a decline in the production of oil while large or increased volumes of water are produced; a severe decrease or total stoppage of oil production appreciably in advance of predictable depletion of resources; and a noticeable decrease in oil production following repair work in the well wherein aqueous systems had been employed. If any of the above conditions is recognized the present method is recommended for treating the oil well.

The present composition, made up of the selected $R_1R_2$ phenoxypolyalkyleneoxyalkanol, and preferably sulfosuccinate, and an oil carrier, is introduced into the oil well in amounts sufficient to reach the contemplated regions or smaller volumes of the composition may be used followed by a volume of crude oil sufficient to force the present composition into the water-block region. The total amount of charged material will, of course, vary principally with the size of the well to be treated. Generally, volumes of the instant composition ranging from several hundred to several thousand gallons will be satisfactory. Volumes used will usually be in the range of 100 to 10,000 gallons or more as desired.

The charged material is kept in the well for a period of time sufficient to permit it, and more particularly the included components, to reach the water-block areas. Therefore, if preliminary observations indicate that the water-block area is extended or remote from the bore of the well or both more time is required for the flow, diffusion, and mixing of the instant-carrier composition with the water-block area than if the region of the water-block is small or vicinal to the bore of the well or both.

In most cases, the charged material will be kept in the well for about eight to thirty hours or more, as desired. At the end of the treatment period the charged material is pumped out along with the water from the water-block. The effect of the treatment is readily and rapidly apparent. An appreciable increase in the flow of oil is a substantially immediate consequence or oil will start to flow again from completely water-blocked wells.

In the great majority of cases one treatment brings about the desired result, but, if desired, a similar subsequent treatment may be used. At the conclusion of the treatment, the mixture or emulsion of the charged material, the freed water, and the oil, flowing from the well is preferably sent to settling tanks or basins or directly to processing with little delay or expense. The charged material may possibly be reused particularly if the component or components in the oil carrier are present in the upper part of the previously defined range.

The present method is valuable in the treatment of oil wells having stubborn or adverse water-block conditions. Satisfactory results are obtained no matter how vast the water-block is, how near to or far from the bore of the well the block is, or how much water is involved. The instant invention is quite effective when voluminous amounts of water are involved even if the salt content of the water is high. There are no tendencies for the components in the oil carrier to separate and be lost nor is there any danger of a rigid gel formation occur-ring, which might otherwise substantially frustrate the elimination of the water-block.

The present method may be employed alone or in conjunction with other known oil-well procedures, such as acidizing and the like, as desired, with satisfactory results. The present composition may, also, be employed with other water-block breaking compositions, if desired, with good results.

The outstanding attribute of the present invention is the unexpected concomitance of its valuable properties of effectiveness and inexpensiveness. This instant method brings about the desired result in water-blocked oil wells with dispatch and economy. The present method restores oil wells, made sluggish and seemingly exhausted by varying degrees of water-block, to a state of active commercial production in an unprecedented manner. A measure of the success of the instant invention is that it pays for itself usually within a matter of days after its use. In order to obtain the beneficial results of this invention it is necessary to rigidly adhere to the defined components, with their significantly restricted structures and their stated proportions and percentages.

This application is a continuation-in-part of our application Serial Number 582,319, filed May 3, 1956, now abandoned.

We claim:

1. A composition consisting essentially of an oleaginous carrier having incorporated therein compounds having the formulas I 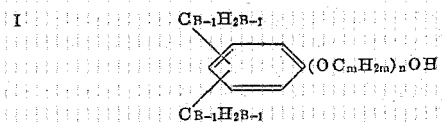

and

II $R_3OH$ so that the total of components I and II in said composition ranges from about 0.1 to 8.0% by weight, in which B is an integer of 1 to 21 totalling between 13 and 26 in said formula, $m$ is an integer of 2 to 4, $n$ is an integer of 6 to 15, and $R_3$ is a member from the class consisting of alkylphenyl groups containing from 14 to 18 carbon atoms, alkyl groups of 12 to 25 carbon atoms, and alkoxyalkyl groups of 12 to 25 carbon atoms, said II component being present in amounts by weight of 5 to 50% of said I component, said I component containing at least some oxyethylene units.

2. A composition consisting essentially of an oleaginous carrier having incorporated therein compounds having the formulas I 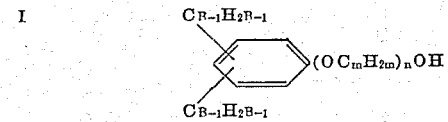

and

II $R_3OH$ so that the total of components I and II in said composition ranges from about 0.5 to 3.0% by weight, in which B is an integer of 1 to 21 totalling between 13 and 26 in said formula, $m$ is an integer of 2 to 4, $n$ is an integer of 6 to 15, and $R_3$ is a member from the class consisting of alkylphenyl groups containing from 14 to 18 carbon atoms, alkyl groups of 12 to 25 carbon atoms, and alkoxyalkyl groups of 12 to 25 carbon atoms, said II component being present in amounts by weight of 5 to 25% of said I component, said I component containing at least some oxyethylene units.

3. A composition consisting essentially of an oleaginous carrier having incorporated therein compounds having the formulas I 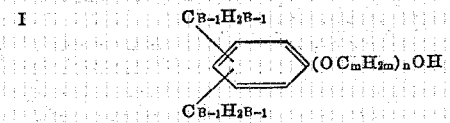

II $R_3OH$ and

III $\begin{pmatrix} CH_2COOR_4 \\ CHCOOR_5 \\ SO_3- \end{pmatrix}_x M$ so that the total of components I, II, and III in said composition ranges from about 0.1 to 8.0% by weight, in which B is an integer of 1 to 21 totalling between 13 and 26 in said formula, $m$ is an integer of 2 to 4, $n$ is an integer of 6 to 15, $R_3$ is a member from the class consisting of alkylphenyl groups containing from 14 to 18 carbon atoms, alkyl groups of 12 to 25 carbon atoms, and alkoxyalkyl groups of 12 to 25 carbon atoms, $R_4$ and $R_5$ are members of the group consisting of alkyl, alkenyl, and aralkyl groups whose combined number of carbon atoms totals from 10 to 20, M is a member of the class consisting of alkali metals, alkaline earth metals, an ammonium group, and a low molecular weight amino group, and $x$ is an integer of 1 to 2 varying with the valence of M, said II component being present in amounts by weight of 5 to 50% of said I component and said III component being present in amounts by weight of one-tenth to ten times that of said I component, said I component containing at least some oxyethylene units.

4. A composition consisting essentially of an oleaginous carrier having incorporated therein compounds having the formulas I 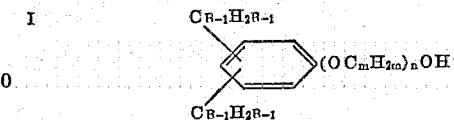

II $R_3OH$ and

III $\begin{pmatrix} CH_2COOR_4 \\ CHCOOR_5 \\ SO_3- \end{pmatrix}_x M$ so that the total of components I, II, and III in said composition ranges from about 0.5 to 3.0% by weight, in which B is an integer of 1 to 21 totalling between 13 and 26 in said formula, $m$ is an integer of 2 to 4, $n$ is an integer of 6 to 15, $R_3$ is a member from the class consisting of alkylphenyl groups containing from 14 to 18 carbon atoms, alkyl groups of 12 to 25 carbon atoms, and alkoxyalkyl groups of 12 to 25 carbon atoms, $R_4$ and $R_5$ are members of the group consisting of alkyl, alkenyl, and aralkyl groups whose combined number of carbon atoms totals from 10 to 20, M is a member of the class consisting of alkali metals, alkaline earth metals, an ammonium group, and a low molecular weight amino group, and $x$ is an integer of 1 to 2 varying with the valence of M, said II component being present in amounts by weight of 5 to 25% of said I component and said III component being present in amounts by weight of one-tenth to ten times that of said I component, said I component containing at least some oxyethylene units.

5. A composition consisting essentially of an oleaginous carrier having incorporated therein from 0.1 to 8.0% by weight of I 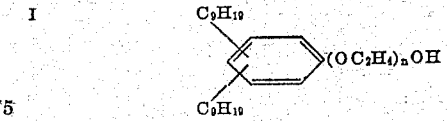

and

II 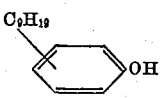

in which n is an integer of 7 to 12 and said II is present in amounts by weight of 5 to 50% of said I.

6. A composition consisting essentially of an oleaginous carrier having incorporated therein from 0.1 to 8.0% by weight of I 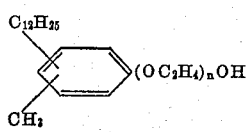

and

II $C_{12}H_{25}OH$ in which n is an integer of 7 to 12 and said II is present in amounts by weight of 5 to 50% of said I.

7. A composition consisting essentially of an oleaginous carrier having incorporated therein from 0.1 to 8.0% by weight of I 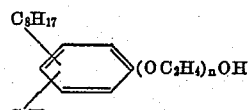

and

II 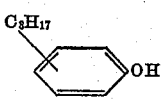

in which n is an integer of 7 to 12 and said II is present in amounts by weight of 5 to 50% of said I.

8. A composition consisting essentially of an oleaginous carrier having incorporated therein from 0.1 to 8.0% by weight of I 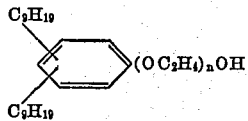

and

II 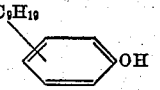

and III dioctyl sodium sulfosuccinate, in which n is an integer of 7 to 12, said II is present in amounts by weight of 5 to 50% of said I, and said III is present in amounts of one-tenth to ten times that of said I.

9. A composition consisting essentially of an oleaginous carrier having incorporated therein from 0.1 to 8.0% by weight of I 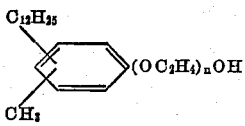

and

II $C_{12}H_{25}OH$ and III dioctyl sodium sulfosuccinate, in which n is an integer of 7 to 12, said II is present in amounts by weight of 5 to 50% of said I, and said III is present in amounts of one-tenth to ten times that of said I.

10. A method for treating water-blocked oil wells comprising introducing into said well the composition of claim 1.

11. A method for treating water-blocked oil wells comprising introducing into said well the composition of claim 2.

12. A method for treating water-blocked oil wells comprising introducing into said well the composition of claim 3.

13. A method for treating water-blocked oil wells comprising introducing into said well the composition of claim 4.

14. A method for treating water-blocked oil wells comprising introducing into said well the composition of claim 5.

15. A method for treating water-blocked oil wells comprising introducing into said well the composition of claim 6.

16. A method for treating water-blocked oil wells comprising introducing into said well the composition of claim 7.

17. A method for treating water-blocked oil wells comprising introducing into said well the composition of claim 8.

18. A method for treating water-blocked oil wells comprising introducing into said well the composition of claim 9.

References Cited in the file of this patent

UNITED STATES PATENTS

| | | |
|---|---|---|
| 2,233,381 | DeGroote et al. | Feb. 25, 1941 |
| 2,356,205 | Blair et al. | Aug. 22, 1944 |
| 2,356,254 | Lehmann et al. | Aug. 22, 1944 |
| 2,369,831 | Jones | Feb. 20, 1945 |
| 2,465,237 | Larsen | Mar. 22, 1949 |
| 2,779,418 | Garst | Jan. 29, 1957 |
| 2,792,894 | Graham et al. | May 21, 1957 |
| 2,800,962 | Garst | July 30, 1957 |
| 2,874,779 | Johnson | Feb. 24, 1959 |